Feb. 14, 1967     C. B. BROWN     3,304,495
SUBMARINE DETECTION SYSTEM
Filed July 11, 1952
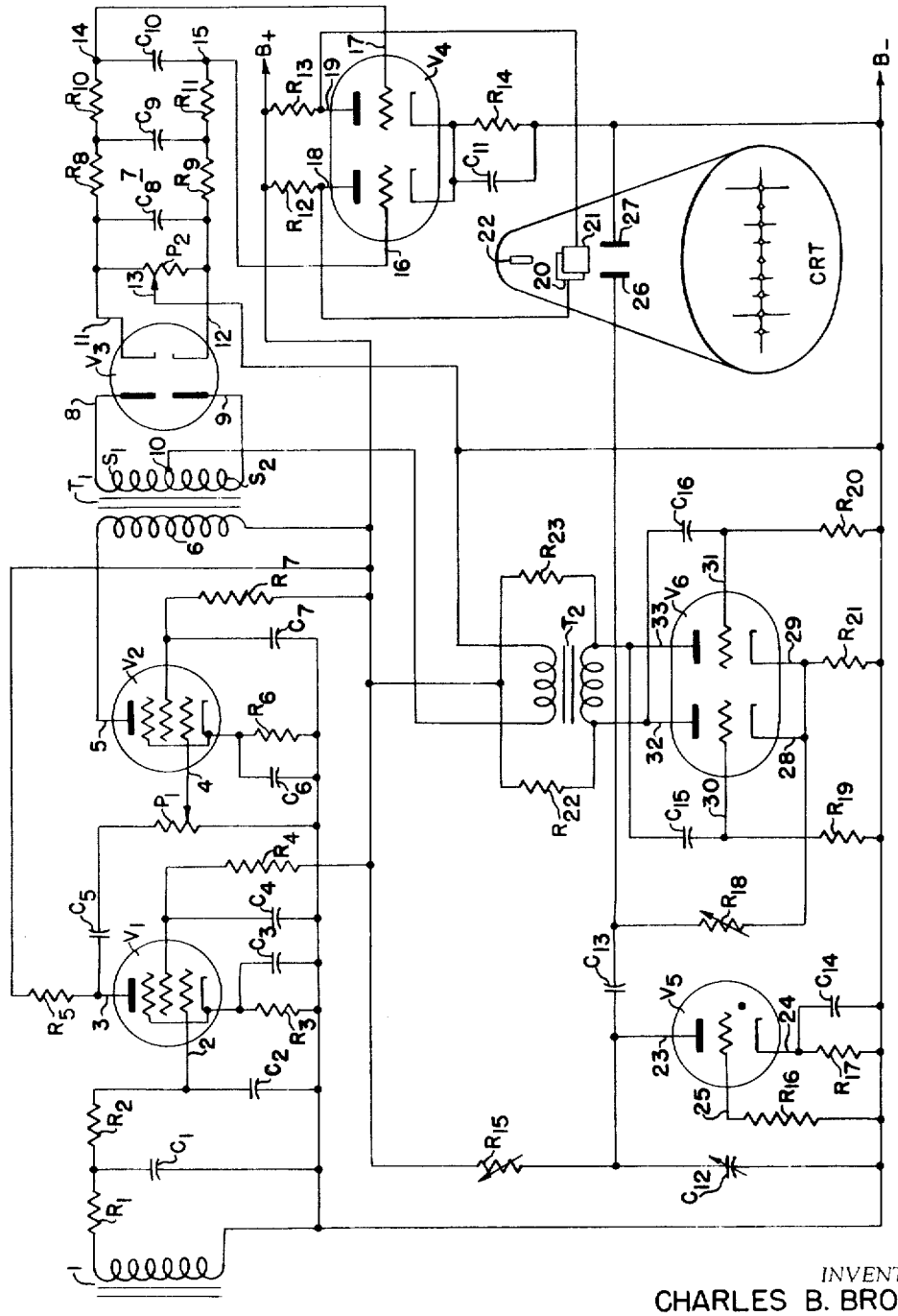
INVENTOR
CHARLES B. BROWN
BY
ATTORNEYS United States Patent Office 3,304,495
Patented Feb. 14, 1967

3,304,495
SUBMARINE DETECTION SYSTEM
Charles B. Brown, 1402 Elson St.,
Takoma Park, Md. 20012
Filed July 11, 1952, Ser. No. 298,487
5 Claims. (Cl. 324—77)

The invention described herein may be manufactured and used by or for the government of the United States of America for governmental purposes without the payment of any royalties thereon or therefor.

This invention relates to a system for the detection of submarines operating under water wherein the presence of a submarine in the ambient environment of the detection device is ascertained from certain properties of the physical phenomena associated with the electric motor of the submarine and relates to "magnetic listening for indications thereof." The instant apparatus relates to the combination of a sensitive magnetic detection device which is tuned to the frequency bands in which alternating magnetic fields indicative of such phenomena are most frequently encountered and thus more likely to be readily detected. Additionally it includes panoramic viewing on a cathode ray tube in conjunction with frequency analyzing apparatus for providing continuous indications of the reception and persistence of the signal energy in the particular frequency band selected. It is thus apparent that in the presence of a signal possessing the necessary frequency characteristics for detection, and in the vicinity thereto the apparatus will provide a pip indication on a cathode ray tube.

The principal sources of the alternating magnetic field of the character for which the instant invention is adapted for reception and display, arise in the submarine from properties inherent with commutator ripple, the frequency of which is of a character distinguishing it from other types and frequencies of ambient signal sources. Similar signals of suitable character which result from armature tooth ripple in the main electric motors used to propel the vessel while submerged, also provide signal intelligence characteristic of a submarine. These characteristics provide an advantageous criterion from a detection standpoint in that signals of this nature are continuously emitted from the motors unless the submarine is operating in water shallow enough to allow it to lay on the bottom without operation of the motors. Under any other condition of service use of the submarine, these motors must be operated continuously. The apparatus provides advantages over the prior art "acoustic listening" type detection systems since a disadvantageous aspect thereof resides in the submarine operational relationship existing between the acoustic detector and the submarine since it is possible to drive the screws of the submarine at reduced speeds below the so called "silent speeds" at which point very little acoustic energy is radiated and presented for pickup by such detection systems. However even at such low operating speeds some magnetic ripple is always present as a consequence of the operation of the motors.

It has been determined from tests that the direct current fields reach values of the order of 30 milligauss at 30 feet when the motors are operated at half current. The presence of a 1/100 ripple represents a field of 0.3 milligauss. The intensity of this field diminishes with distance and the above value may be considered as reduced to 1 milligauss when the detector pickup is at distance of 200 feet from the signal source. The detection of this ripple field in the presence of normal random fluctuation presents a problem of considerable magnitude.

It is possible, however, to obtain pickup of such signals in this low intensity field by utilizing magnetic coils for the desired frequency range for this operation with permeabilities of the order of 500 and in cross-sectional areas of 1 square inch, with length dimensions not to exceed 30 inches. Coil units of this type will produce results, wherein 1 microgauss field in air will set up a 3 milligauss in the core. Using a one thousand turn coil and a suitable coupling transformer this field is capable of producing a voltage at the grid of the first amplifier tube of 18 millivolts for a frequency of 500 cycles per second.

In service applications it is thought impractical to use highly resonant tuned circuits, for the frequencies of this ripple field due to the ever changing nature of the ripple frequency with changes of motor speed in the submarine, and the problem of determining or locating the exact frequency thereof. The preferred embodiment of the invention therefore incorporates a frequency selector hereinafter designated as a "synchronous integrator," in a frequency analyzer circuit of a type designed to give a continuous indication of the reception of signal frequencies of a predetermined character over the band of frequencies chosen.

One object of the instant invention resides in the provision of apparatus capable of pickup of armature ripple frequencies signals produced by a submarine under water, comparing the detected frequency to a variable frequency within a predetermined frequency range which includes the variable frequency range of a submarine motor ripple to provide a response thereto indicative of an analogous signal in the given range and operable in a manner to present a visual image on a cathode ray tube of signals thus received within the predetermined frequency range.

It is a further object of this invention to provide means for detection of the presence of a torpedo in an underwater environment adjacent a vessel when the magnetic field changes produced by the motor of the torpedo are detected and compared in a manner to indicate the presence of signals of such nature which lie in a characteristic frequency range.

Another object of the invention lies in the detection of the presence of a submarine at any time when the electric drive motors thereof are in operation.

An additional object of this invention resides in the provision of a submarine detection system which advantageously utilizes a magnetic field signal produced by operation of submarine electromotive devices wherein a characteristic peculiar to said submarine as to frequency range is detected and displayed for comparison in a visual response-image type apparatus.

Other objects and many of the attendant advantages of this invention will be readily appreciated as the same becomes better understood by reference to the following detailed description when considered in connection with the accompanying drawings wherein:

The figure is a schematic diagram of a one embodiment of the submarine detection device.

Referring now to the drawing, a pickup coil of the magnetometer variety is shown at 1 which feeds into a frequency selective two stage RC filter circuit comprising resistors $R_1$, $R_2$ and condenser $C_1$ and $C_2$ at the grid input 2 of the first stage amplifying tube $V_1$. This conventional resistance coupled pentode amplifier stage comprising cathode biasing resistor $R_3$, bypass condenser $C_3$, screen voltage dropping resistor $R_4$ and bypass condenser $C_4$ therefor, presents the signal output at the plate 3 thereof and across the load resistance $R_5$ through D.C. blocking condenser $C_5$ to couple the grid 4 of a seconl pentode connected amplifier tube stage $V_2$ thereto. The resistance-capacitance coupling between these stages includes a suitable variable potentiometer $P_1$ for varying the gain appearing at the output of the second stage. The tube circuitry for tube $V_2$ of the second stage comprises cathode bias resistor $R_6$, cathode bypass condenser $C_6$ therefor, screen voltage dropping resistor $R_7$ and its bypass condenser $C_7$, all of which are returned to B— as shown. The signal output of this stage appearing at the plate 5 and across the plate load inductance therefor at 6 to B+ is inductively coupled through the primary of $T_1$ to the secondary thereof.

The transformer coupling as applied to the center tapped secondary windings $S_1$ and $S_2$ of transformer $T_1$ is thereafter applied to the plates 8 and 9 of dual diode tube $V_3$. Assuming for purposes of better understanding, a condition with no external control over the dual diodes, which control as hereinafter described in greater detail, is however ever present during actual operating conditions, the separate secondary outputs of the transformer as taken with respect to the virtual ground at the center tap 13 are rectified and returned through $P_2$ to B— or ground. The rectified outputs of the separate diodes are applied in pushpull relationship to an integrator network 7 for phase discrimination thereof with respect to the phase of a local oscillator generated control signal. The three RC filter stages of the integrator for the rectified phase detected signals comprise resistors $R_8$, $R_9$, $R_{10}$ and $R_{11}$, and condensers $C_8$, $C_9$ and $C_{10}$. The adjustable potentiometer $P_2$ which is connected across the cathodes 11 and 12 of tube $V_3$ provides for balanced injection at 10 and 13 of a phase-comparison control voltage derived from the above mentioned local oscillator which comprises the multivibrator circuit of tube $V_6$ hereinafter described in greater detail.

The multivibrator output is also applied to the center tapped secondary windings $S_1$ and $S_2$ of transformer $T_1$, and thereafter respectively to the plates 8 and 9 of the dual diode tube $V_3$ with the return thereof through the tap of $P_2$.

The amplified signal appearing across the secondaries $S_1$ and $S_2$ is rejected if it is of differing phase or frequency with the multivibrator control over the diodes, and passed thereby if in phase and frequency correspondence thereto. The rectified outputs of the separate diodes appearing thereacross with in-phase signal conditions are applied in push-pull relationship, at the cathodes of the synchronous electronic valve or switch provided by the dual diode tube $V_3$, to the integrator network 7 for integration thereof. This synchronous electronic switch functions in response to oscillator control thereover which is of a continuously variable frequency within a predetermined range to pass certain frequency components of the detected complex signal when the phase and frequency thereof correspond to the phase and frequency of the multivibrator output. Since the multivibrator signals are of a varying nature, one or a plurality of frequency components of the complex ripple frequency signals will be passed in correlation with the rate of change of local oscillator frequency. The advantage of this relationship will become apparent with the hereinafter described function of the cathode ray tube image.

The potentiometer $P_2$ is adjusted for optimum balanced operating conditions in a manner whereby the multivibrator signal is applied in balanced relationship through the separate diodes during opposing half cycles of the signal and thereby provides a signal switching function whereby the frequency selected signal output across the respective secondaries of $T_1$ and during corresponding half cycles is passed at the respective diode to the integrator at 7 if the incoming signal is in phase with the multivibrator output. When there is no detected signal present the adjustment of $P_2$ is such that the multivibrator signals will follow opposed paths during alternate half cycles with a net result that no voltage condition will exist at the cathode terminals of $V_3$. It will thus be apparent that a voltage signal applied to the synchronous switch circuit by the amplifier stages preceding transformer $T_1$ will provide a signal output at terminal points 14 and 15 of the integrator only when the frequency and phase of the input signal is in correspondence with the phase and frequency of the signal voltage applied at varying frequencies thereacross by the output of the multivibrator. Since the multivibrator continuously varies in frequency the circuitry will detect certain desired characteristic frequencies existing in a complex signal and will reject all others. The desired frequencies will pass the pair of diodes at the instantaneous condition when the phase thereof as controlled by the local oscillator is in correspondence with that of the diode control. The output of the integrator network will appear as separate varying D.C. signals respectively at 14 and 15. The polarity of terminal 14 is always opposite to that of terminal 15 or 180° out of phase therewith when a rectified signal of a frequency corresponding to the multivibrator output and in phase therewith is passed by the synchronous switch. This output appearing at 14 and 15 of the pushpull synchronous integrator is applied in pushpull to the respective grids 16 and 17 of the dual triode $V_4$, wherein the separate outputs appearing at the plates 18 and 19 thereof are applied respectively to the vertical deflection plates 20 and 21 of the cathode ray tube CRT, wherein the beam of electrons emitted from the cathode 22 of the tube gun is caused to produce a pip on the screen thereof and in correlated relationship with the sweep applied by the hereinafter described sweep oscillator.

The horizontal sweep for the cathode ray tube is provided by a saw tooth signal derived from the circuitry of sweep generator tube $V_5$. This gas filled triode operating in an oscillating circuit comprising grid standoff resistor $R_{16}$ at grid 25 thereof, cathode bias resistor $R_{17}$ and bypass condenser $C_{14}$ wherein the conduction initiated by the discharge of the RC circuit variable condenser $C_{12}$ through a path from plate 23 to cathode 24 of the tube $V_5$ functions to produce a sweep retrace at the horizontal deflection plates 26 and 27 of CRT. The signal output of the tube $V_5$ is also applied as an input signal through resistor $R_{18}$ to the cathodes 28 and 29 of the multivibrator tube $V_6$. This two stage resistance coupled amplifier circuit which comprises a dual triode tube arrangement in a common envelope having the A.C. plate output at 32 and across dropping resistor $R_{22}$ of the first stage thereof coupled through condenser $C_{16}$ to drive the grid 31 of the second stage, and the A.C. output at the plate 33 of the second stage and across resistor $R_{23}$ coupled by D.C. blocking condenser $C_{15}$ to the grid 30 of the first triode stage provides a free running relationship thereof.

The inherent unbalance of circuit components and tube characteristics is sufficient to initiate oscillation of the multivibrator circuit in the absence of an initially applied signal. The control voltage for this stage is derived from the sweep oscillator circuitry by applying the changing D.C. voltage as a signal thereto as a voltage is built up on condenser $C_{12}$ with flow of current thereto from B+, to the cathodes 28 and 29 of $V_6$. This provides a dual function in that it also provides a horizontal sweep for the CRT. The frequenecy of the multivibrator thus varies at the same rate of change as the rate of horizontal sweep. The position of pips along the horizontal sweep with phase detection of a proper input signal are thus correlative with frequency of the multivibrator. The condenser $C_{12}$ thereafter discharges when the voltage thereon is sufficient to initiate current flow from plate to cathode of the tube $V_5$. The components $C_{12}$ and $R_{15}$ may be varied to change the time constants of the circuit as desired. This condenser discharge provides for retrace of the horizontal sweep, and at the same time applies a fast rate of change varying D.C. signal from this sweep generator tube through blocking condenser $C_{13}$ and variable resistance $R_{18}$ as a saw tooth pulse to the cathodes 28 and 29 of the multivibrator tube $V_6$ in a manner to vary the effective cathode bias of each triode section and change the grid to cathode potentials thereof with a resultant change to restore the natural frequency of the multivibrator for subsequent change with the next succeeding pulse buildup. This produces a repetitive variable change in multivibrator frequency within limits determined by preselection of circuit components. The A.C. output at the respective plates of this stage is applied by transformer coupling in $T_2$ to the secondary of transformer $T_1$ at the center tap 10 thereof as hereinabove set forth and is balanced to ground or B— at a potentiometer $P_2$.

The operation of the system is such that when $P_2$ is adjusted to provide a balanced current flow condition through the two diodes during alternate half cycles of the multivibrator control signal, with the pickup at 1 shorted out, the resulting condition is such that there will be no D.C. voltage appearing across 11 and 12 due to multivibrator action. The application to the pickup coil of a complex voltage signal including frequencies within the variable control frequency range of the variable frequency local oscillator $V_6$ which is of the same phase relationship as this multivibrator control signal appearing at the transformer $T_1$ and the voltage divider $P_2$ will produce a useful output from the integrator network 7 for the grids of the dual triode $V_4$.

It will thus be apparent that the signal output of the integrator as permitted to pass by jointly controlled action of the sweep oscillator and of the multivibrator output appearing at $T_2$ simultaneously therewith and as applied for comparison in the synchronous switch and thereafter fed to the integrator, functions to compare the phasè relationship of signals of corresponding frequency appearing in each of these circuits and applying the detected signal to the vertical deflection plates 26 and 27. The pip which is presented on the face of the cathode ray tube CRT represents the in-phase condition when a signal picked up by the detector is of a frequency within the range as for example of 20 to 250 cycles provided by the varying output frequency of the multivibrator. These pips do not represent all cycles of signals of this corresponding frequency appearing in the amplifier channel and corresponding to the frequency of the multivibrator. The pips only appear when the two signals are of the same phase relationship. It is apparent however that signals of corresponding frequencies will come into phase at the synchronous diode switch with the multivibrator since the output of the multivibrator is varying with respect thereto. Also the system is capable of detecting a plurality of different frequencies within the variable range of the multivibrator, with the pips appearing on the screen in correlation therewith. Since the sweep frequency which controls the multivibrator is constantly varying it thus presents a plurality of these pips in spaced relationship across the cathode ray tube as the sweep traverses with the conducting half cycles of the diodes. It is thus possible to detect very small voltages well down into the normal random fluctuation. The device inherently possesses characteristics of almost infinite rejection of stray alternating fields of sinusoidal character.

In actual operation, some sort of gradiometer set up not shown but of an obvious nature is used to balance out the effect of local fields on the submarine vessel. These coils would then be suitably oriented by experimentation to find the best position therefor. This may advantageously be accomplished since submarine chaser vessels do not incorporate large electric motors of the character used to propel a submarine.

Obviously many modifications and variations of the present invention are possible in light of the above teachings. It is therefore to be understood that within the scope of the appended claims the invention may be practiced otherwise than as specifically described.

What is claimed as new and desired to be secured by Letters Patent is:

1. In a submarine detection system of a character adapted for pickup of commutator ripple frequency signal intelligence, the combination with a detection means and band pass amplifier means, a phase comparison means connected to the output of said amplifier means, a cathode ray tube, means for applying the output of said phase comparator means to the vertical deflection plates of said cathode ray tube, means providing a horizontal sweep for the electron beam of said cathode ray tube, and variable frequency control means for said phase comparator of a character to permit the passing to said cathode ray tube of all received signal intelligence of phase and frequency correspondence to said control means with a correlative rejection therein of all signals differing therefrom.

2. In a submarine detection system of a character adapted for pickup of commutator ripple frequency signal intelligence, the combination with a detection means and band pass amplifier means, a phase comparison means connected to the output of said amplifier means, cathode ray tube means, means for applying the output of said phase comparator means to the vertical deflection plates thereof, means providing a horizontal sweep to the electron beam of said cathode ray tube, variable frequency control means for gating said phase comparator and connected thereto in a manner to block signals of differing phase or frequency with respect thereto and to permit the passing to said cathode ray tube of all received signal intelligence of phase and frequency correspondence to the instantaneous signal of said control means thereby providing a rejection therein of all signals differing therefrom and means coupled to said sweep means for correlating the instantaneous frequency of the variable frequency of said control means with the sweep producing means for the cathode ray tube in a manner whereby the indications representing different frequencies in a complex signal as passed by the phase comparison means, are displayed on said tube with the pips produced at differing frequencies disposed to be representative of the time rate of frequency change of said control.

3. In combination with the apparatus of claim 2, means for varying the rate of sweep, and means in said variable frequency control means for varying the rate of change of frequencies selected for passing in said phase comparator means with variations in the time rate of change of sweep frequency, thereby to provide panoramic viewing in correlation with said sweep of selected frequency bands in said complex signal and thereby permit analysis of characteristics thereof.

4. In combination in a submarine detection system, a first signal detection means, signal amplification means connected thereto, a phase discriminatory synchronous switching device for passing D.C. components of A.C. signals of corresponding phase and frequency to that of the control frequency therefore, control means for said synchronous switch, means for synchronizing the displaying of said passed signals for visual indication with said control means, means comprising a cathode ray tube to provide a visual indication of said passed signals and connected to the circuitry of said control means in a manner to display said passed signals in correlation with change in frequency of said control.

5. A submarine detection system comprising a first signal means responsive to magnetic ripple frequency characteristics of a complex signal intelligence of a character indicative of the operation of electric drive motors for a submarine, phase detection means for passing D.C. components of received A.C. signals which are of frequency and phase correspondence to a control therefor, variable frequency control means for said phase detector, integration and amplification means connected to the output of said phase detector, visual indicating means for display of said amplified phase detected signals, and a second control means for varying the frequency of said variable control means and for correlating the indications on said visual means with frequency change of said variable frequency control.

References Cited by the Examiner

UNITED STATES PATENTS 1,994,232  3/1935  Schuck.
2,569,626  10/1951  Young.

WALTER L. CARLSON, *Primary Examiner.*

NORMAN H. EVANS, *Examiner.*

R. E. BERGER, P. F. WILLIE, *Assistant Examiners.*